United States Patent [19]

Ciccarone

[11] Patent Number: 4,529,356
[45] Date of Patent: Jul. 16, 1985

[54] DEVICE FOR CONTROLLING THE FLOW PATTERN OF THE EXHAUST GAS OF A SUPERCHARGED INTERNAL COMBUSTION ENGINE

[75] Inventor: Angelo Ciccarone, Milan, Italy

[73] Assignee: Alfa Romeo S.p.A., Milan, Italy

[21] Appl. No.: 449,973

[22] Filed: Dec. 15, 1982

Related U.S. Application Data

[63] Continuation of Ser. No. 165,715, Jul. 3, 1980, abandoned.

[30] Foreign Application Priority Data

Jul. 18, 1979 [IT] Italy .............................. 24456 A/79

[51] Int. Cl.³ ........................................... F04D 29/44
[52] U.S. Cl. ..................................... 415/210; 415/207; 422/176; 60/299
[58] Field of Search ................... 415/207, 210, 217; 60/597, 599, 605, 299, 280; 422/176

[56] References Cited

U.S. PATENT DOCUMENTS

| | | | |
|---|---|---|---|
| 2,806,645 | 9/1957 | Stalker | 415/210 |
| 2,814,433 | 11/1957 | Brinen | 415/210 |
| 3,388,550 | 6/1968 | Binek | 415/210 |
| 3,775,971 | 12/1973 | Gadefelt | 60/280 |
| 3,880,597 | 4/1975 | Goldschmidt | 422/176 |
| 3,964,875 | 6/1976 | Chang | 422/176 |
| 3,984,207 | 10/1976 | Abthoff et al. | 60/299 |
| 4,002,433 | 1/1977 | Öser | 422/176 |
| 4,134,733 | 1/1979 | Völker et al. | 422/176 |
| 4,182,120 | 1/1980 | Niebylski | 422/176 |
| 4,247,520 | 1/1981 | Wörner | 422/176 |

Primary Examiner—Henry C. Yuen
Assistant Examiner—John Kwon
Attorney, Agent, or Firm—Charles A. Brown; Charles E. Brown

[57] ABSTRACT

A device for controlling the flow pattern of the exhaust gas of a supercharged internal combustion engine comprises a diverging conduit disposed at the outlet of an exhaust gas operated centripetal turbine, a radially finned conduit portion, a converging conduit and an exhaust pipe for conveying the gas to atmosphere. The back pressure at the engine exhaust is thus minimized.

5 Claims, 3 Drawing Figures

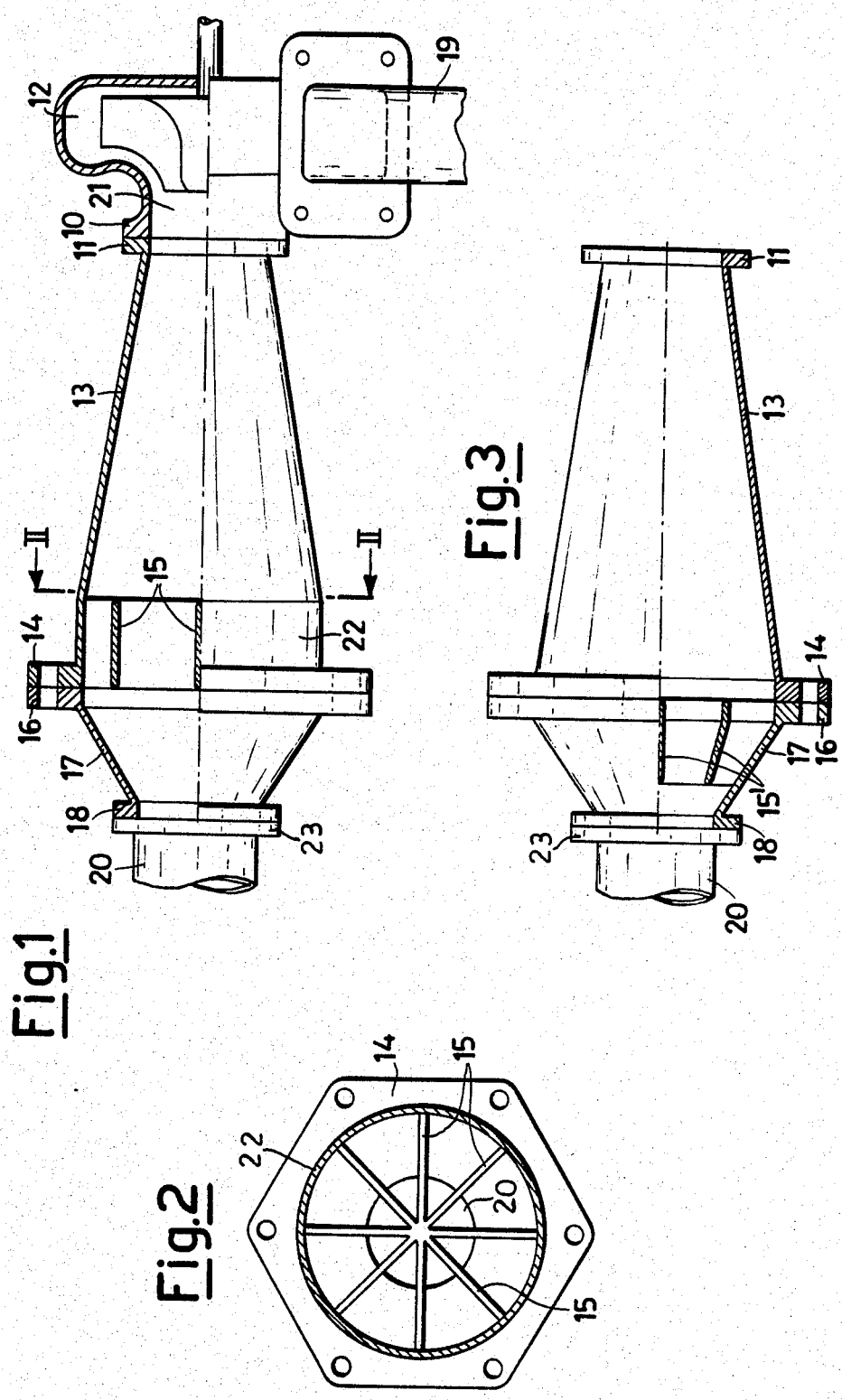

DEVICE FOR CONTROLLING THE FLOW PATTERN OF THE EXHAUST GAS OF A SUPERCHARGED INTERNAL COMBUSTION ENGINE

This is a continuation of application Ser. No. 165,715 filed July 3, 1980, now abandoned.

One of the methods used by automobile engine manufacturers for attaining high power for a small piston displacement is supercharging, which is carried out by means of a turbo compressor in which a turbine driven by the engine exhaust gas drives an air feed compressor for the engine.

By using supercharging, engines are obtained which have a low weight for equal delivered power, and can operate with low fuel consumption and low exhaust emission.

One of the elements to take into consideration in the operation of a turbine for these applications is the considerable variation in the throughput of the exhaust gas which passes through it. In general, it is not possible for the turbine to always operate under best efficiency conditions unless a turbine of variable geometry is used. Instead, a fixed geometry turbine is used, in particular a turbine of the centripetal type, because of which there is only one zone in the working range in which operation takes place in accordance with the design data and the outlet gas flow from the turbine follows an axial pattern. In all other zones, the outlet gas flow from the turbine is characterized by tangential velocity components of a greater or lesser intensity, which lead to a pressure drop and back pressure at the engine exhaust. These velocity components give rise to a vortex movement, with a consequent drop in delivered power.

From the law governing vortex motion, it is apparent that the tangential velocity components are greater the smaller the vortex radius, and thus in order to reduce the gas pressure drop it has been proposed to dispose at the turbine outlet a diverging conduit which, because its cross-section progressively increases, enables the intensity of the tangential velocity components of the gas to be reduced.

This method is advantageous for recovering the power delivered by the engine, but is unsatisfactory from the constructional aspect because it requires the use, downstream of the diverging conduit, of an exhaust pipe for conveying the gas to atmosphere which at least over a certain portion must have a diameter equal to the maximum diameter of the diverging conduit itself.

As the tangential velocity components of the gas are lower the greater the maximum diameter of the diverging conduit, the method described requires the use of an exhaust pipe having a diameter greater than would be necessary for correctly conveying the gas to atmosphere.

Increasing the diameter of the exhaust pipe, and the consequent increase in volume of the silencers with which the pipe is generally fitted, is inconvenient for weight questions, and often is impossible because of size reasons.

The object of the present invention is to minimize the back pressure at the engine exhaust while using, downstream of the diverging conduit connected to the turbine outlet, an exhaust pipe having a reduced diameter which is less than the maximum diameter of the diverging conduit. This is attained by disposing downstream of the diverging conduit a radially finned conduit portion together with a converging conduit for connection to the exhaust pipe of reduced diameter.

This method enables the gas flow at the outlet of the diverging conduit to be controlled by impressing on it an axial flow pattern under all throughput conditions, without leading to pressure drop during passage through the pipe of reduced diameter.

The exhaust gas leaving the turbine and entering the diverging conduit has its tangential velocity reduced as the conduit diameter increases. At this point, the radially finned conduit portion prevents the gas from following a spiral path, and compels it to flow in an axial direction along the longitudinal passages created by the finned conduit portion. Consequently, the finned conduit portion breaks the vortex and transforms the flow of tangential pattern into a flow of axial pattern, so that the gas flows with this pattern into the converging connector and into the exhaust pipe of reduced diameter.

As the tangential velocity of the gas at the outlet of the diverging conduit is low, the change in flow direction takes place with only a small pressure drop. Passage through the exhaust pipe of reduced diameter also takes place without a high pressure drop, because in the converging connector there is a gradual reduction in cross-section from the large outlet cross-section of the diverging conduit to the small inlet cross-section of the exhaust pipe of reduced diameter.

Overall, a low pressure drop is determined at the engine exhaust, and this result is influenced to a large degree by the presence of the finned conduit portion because it prevents the gas, after its tangential velocity has been reduced in the diverging conduit, from reacquiring in the converging conduit a vortex flow pattern which would be accompanied by a high tangential velocity due to the progressive reduction in the diameter of the converging conduit.

The aforegoing will be more apparent with reference to FIGS. 1 to 3, which are diagrammatic representations of preferred embodiments of the invention, by way of non-limiting example.

FIG. 1 is a partly sectional side view of a turbine driven by the exhaust gas of an internal combustion engine, and of the device for controlling the flow of said gas disposed at its outlet. The turbine, of centripetal type, is indicated overall by 12. The reference numeral 19 indicates the inlet conduit for the engine exhaust gas into the turbine 12, and the reference numeral 21 indicates the outlet conduit for the gas from the turbine. The reference numeral 13 indicates a conduit which diverges in the gas flow direction, to terminate with a cylindrical portion 22 provided with radial fins 15. The diverging conduit is connected to the turbine outlet conduit 21 by the flange 11 and backing flange 10, and is provided with the flange 14 for connection to the backing flange 16 of the converging conduit 17. The converging conduit 17 is provided with a flange indicated by 18 for connection to the backing flange 23 of the exhaust pipe 20 of reduced diameter, which conveys the engine exhaust gas to atmosphere.

FIG. 2, which is a view of the device on the line II—II of FIG. 1, shows the radial arrangement of the fins 15 of the cylindrical portion 22.

FIG. 3 is a partly sectional side view of a modification of the device of FIG. 1. In this case the radial fins 15 are disposed inside the converging conduit 17.

As stated heretofore, under optimum throughput conditions of the turbine 12, the exhaust gas leaves the conduit 21 with a flow of axial pattern. Under all other throughput conditions, these being non-optimum conditions, the flow of the gas leaving the turbine follows a vortex pattern with tangential velocity components. On entering the diverging conduit 13, the gas flows with a vortex pattern but its tangential velocity diminishes because of the increase in diameter of the diverging conduit, until it reaches the cylindrical portion 22 provided with the fins 15 or the converging conduit 17' provided with the fins 15' of FIG. 2. At this point, the fins 15 or 15' prevent the gas from following a spiral path, and compel it to flow in an axial direction along the longitudinal channels created by said fins. The fluid threads leaving the diverging conduit at low tangential velocity assume an axial direction without a large pressure drop precisely because of the low value of this velocity.

After the gas has assumed an axial flow pattern, it is conveyed towards the exhaust pipe 20 of reduced diameter through the converging conduit 17, which because of its gradual reduction in cross-section prevents pressure drop due to the change from the large outlet cross-section of the diverging conduit to the small cross-section of the exhaust pipe 20.

The gas then passes from the turbine outlet to the exhaust pipe with a small pressure drop, and without generating any undesirable back pressure in the engine exhaust.

I claim:

1. A device for controlling the flow pattern of the exhaust gas of a supercharged internal combustion engine provided with a centripetal turbine operated by the exhaust gas for driving an engine supercharging compressor, said device comprising diverging conduit means connected to an outlet of said turbine for receiving exhaust gases discharged from said turbine while reducing the velocity of the discharged exhaust gases, an exhaust pipe for conveying the discharged exhaust gases to atmosphere, said device including between said diverging conduit means and said exhaust pipe a finned conduit portion constituted by a length of converging conduit connected to said exhaust pipe for delivering the discharged exhaust gases from said diverging conduit means directly into said exhaust pipe, said exhaust pipe having a diameter less than the maximum diameter of said diverging conduit, and said converging conduit having radial fin means disposed at an outlet of said diverging conduit for breaking the vortex of discharged gases from said turbine and transforms the tangential flow pattern of the discharged gases into an axial flow pattern whereby the discharged gases flow directly into said exhaust pipe without developing a high pressure drop.

2. A device according to claim 1 wherein said radial fins include axial portions and sloping portions.

3. A device according to claim 1 wherein said radial fins have portions extending into said converging conduit with said radial fin portions sloping radially and axially towards said exhaust pipe.

4. A device according to claim 1 wherein said radial fins have portions extending into said converging conduit with said raidal fin portions sloping radially and axially towards said exhaust pipe.

5. A device according to claim 1 wherein said diverging conduit means has an internal surface free of obstructions whereby the discharged gases will completely permeate the internal surface of said diverging conduit means.

* * * * *